United States Patent [19]

Trahan

[11] Patent Number: 4,673,183

[45] Date of Patent: Jun. 16, 1987

[54] GOLF PLAYING FIELD WITH BALL DETECTING RADAR UNITS

[76] Inventor: Francis B. Trahan, CPO Box 239, (Kuza) Okinawa City, Okinawa, Japan, 904

[21] Appl. No.: 779,092

[22] Filed: Sep. 23, 1985

[51] Int. Cl.$^4$ ............................................. A63B 69/36
[52] U.S. Cl. ............................ 273/176 A; 273/185 R; 342/465; 342/28
[58] Field of Search ................. 273/176, 35 B, 184 A, 273/185 A, 185 B, 185 R; 343/5 PD, 12 R, 465; 364/516, 410–412

[56] References Cited

U.S. PATENT DOCUMENTS

| | | | |
|---|---|---|---|
| 1,869,642 | 8/1932 | Woolman | 273/184 A |
| 3,209,357 | 9/1965 | Wyatt | 343/465 |
| 3,794,992 | 2/1974 | Gehman | 343/5 PD |
| 4,086,630 | 4/1978 | Speiser et al. | 273/185 A |
| 4,545,576 | 10/1985 | Harris | 364/516 |

FOREIGN PATENT DOCUMENTS 2110545  6/1983  United Kingdom ............ 273/185 R

Primary Examiner—Richard C. Pinkham
Assistant Examiner—Mary Ann Stoll Lastova
Attorney, Agent, or Firm—Wenderoth, Lind & Ponack

[57] ABSTRACT

A golf playing arrangement which includes a fairway, a tee area at one end of the fairway, a plurality of radar ground surveillance units located on the fairway at successively greater distance from the tee area, a central processing unit and a video display terminal and putting green adjacent the tee area. Each of the ground surveillance units detects golf balls moving on the ground in a predetermined circular area containing the unit. The central processing unit calculates and the computer terminal visually displays the distance of the unit furthest from the tee area which detects a golf ball moving therethrough, and the sum of a succession of such distances. This arrangement permits a golfer to play a golf-like game without the need to follow a ball from tee to green.

2 Claims, 2 Drawing Figures

GOLF PLAYING FIELD WITH BALL DETECTING RADAR UNITS

BACKGROUND OF THE INVENTION

The invention relates to a new construction of a golf game, and more particularly, to a condensed game of golf in which the players are required to walk only short distance between a tee and a green.

Prior condensed golf games have permitted a player to simulate repeatedly hitting and following after a golf ball until the ball lands on the green as in a conventional game of golf, by hitting successive balls from a tee area, estimating the distance traveled by the ball each time it is hit, until the total distance which the balls have been hit equals a preselected distance to a theoretical green. In accordance with this prior game, the player would then walk over to an adjacent green to "putt out". Such a game is, for example, disclosed in U.S. Pat. No. 2,003,074, issued to B. E. Gage on Feb. 1, 1933.

Such prior games have a number of disadvantages. Since golf balls are often hit long distance such as from 100 to 300 yards, it can be quite difficult to see the final resting place of the ball and estimate the distance it has traveled, even if distance markers are provided. It is also necessary to perform manual calculations of the accumlated distances successive balls are hit and how much further the ball must be hit to reach the "green". Furthermore, if a number of persons are competing with each other, disagreements can arise as to these distances and the number of strokes which have been taken on a particular hole.

It is therefore an object of the present invention to provide a compact golf game which closely simulates a true game of golf without requiring players to follow their ball to a distant green and provides a clear indication of the distance traveled by a ball each time one is hit.

It is another object of the invention to provide such a compact golf game which is suitably located on a portion of a golf driving range.

It is still another object of the invention to provide a compact golf game in which radar detectors and a computer terminal serve to inform the player of the distance each shot has traveled from the tee, the accumulated distance a succession of shots of respective golf ball has driven the balls and the remaining distance required to a "green".

SUMMARY OF THE INVENTION

These and other objects are fulfilled by the compact golf game of the invention which includes a tee, a strip of playing field or fairway extending from the tee, a plurality of radar ground surveillance units (gsu's) located on the playing field strip so as to detect movement of a golf ball over respective predetermined areas of ground about the gsu's, and a central processing unit (CPU) with a video display located at the tee and under the control of the player, for calculating and displaying distances and numbers of shots taken based on data provided by the gsu's. The gsu's are spaced along a line extending away from the tee and the respective areas of coverage surrounding the adjacent gsu's overlap so that the locations of the gsu's detecting a golf ball moving therein would reflect the total distance traveled by the ball. The CPU is arranged to store a plurality of predetermined distances representing distances from tee to green, associated with the golf holes to be represented. The CPU is arranged to calculate and display the distance of the last gsu's or furthest gsu from the tee which detects the ball, and to calculate and display the total number of shots taken and distance represented by those shots corresponding to a particular hole. Thus, an entire round of golf can be played from a single tee, utilizing a single putting green located adjacent to the tee so that the player can "putt out" after reaching each "green" based on his shots from the tee.

In an alternate embodiment, a succession of adjacent playing field strips, one for each "hole", is provided, with gsu's and a tee with adjacent green and video display being provided for each strip.

BRIEF DESCRIPTION OF THE DRAWING

These and other objects and features of the invention will be more completely understood from the detailed description of the preferred embodiment with reference to the drawings in which.

DETAILED DESCRIPTION OF THE PREFERRED EMBODIMENTS

Figure 1:
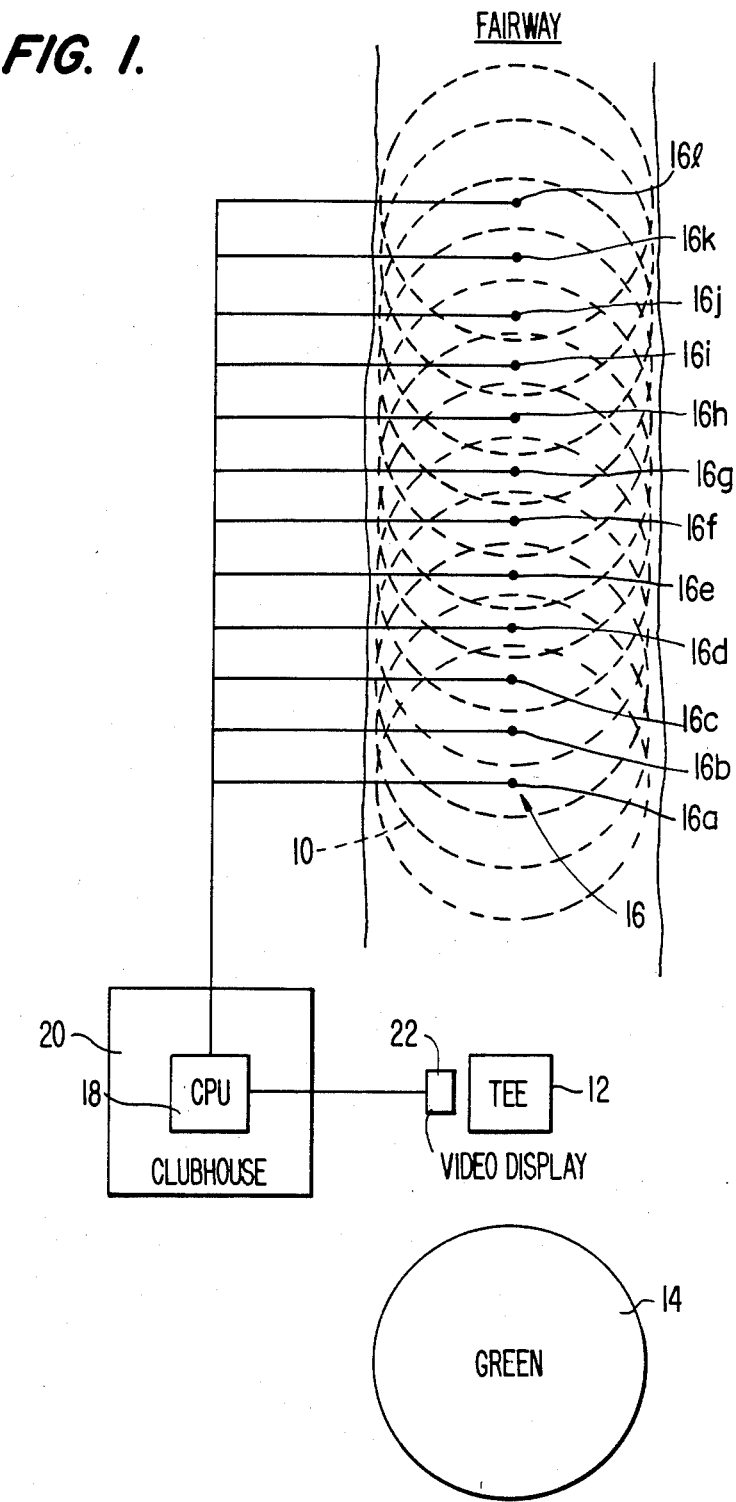
FIG. 1 is a schematic illustration of the invention and FIG. 2 is a simplified flow diagram of the central processing unit thereof when used on the playing field in accordance with the invention.

Referring to FIG. 1 of the drawing, the preferred embodiment of the invention includes a playing field or fairway 10 typically 80 yards wide and 300 yards long extending from a tee area 12. Behind the tee area 12 is a putting green 14. Spaced along the center of the fairway 10 at suitable intervals such as 20 yards along the center line of the fairway 10 are ground surveillance units (gsu's) 16 including gsu's 16a–16l. These ground surveillance units are electrically connected as will be described below to a conventional microprocessor central process unit (CPU) 18 located in a clubhouse 20. The CPU 18 is in turn connected to a conventional video terminal 22 adjacent to the tee 12.

The ground surveillance units 16a–16l may, for example, be conventional ground radar surveillance units such as Model No. HP-H12-175A manufactured by Triplett. Each ground surveillance unit 16a–16l is inserted into the ground and is adjustable to pick up objects such as golf balls moving along the ground within a radial distance which can be preset at, for example, 40 yards. The signals picked up by the gsu's are transmitted digitally to the CPU 18 which convert the signals to a number reflecting the distance S traveled by the ball. For example, if a ball hit from the tee 10 is detected by gsu's 16d, 16e, 16f and 16g only, then the central processing unit would detect the ball having reached the area between 140 and 160 yards from the tee. That is, the central processing unit identifies the activated ground surveillance unit farthest from the tee and transmits to the video terminal for display thereon the distance which the ball must have traveled to activate that ground surveillance unit without also activating the ground surveillance unit further away from the tee 12. Thus, the golfer may be made immediately aware of how far his golf shot traveled from the tee.

The central processing unit also stores a total distance A that the ball is required to be displaced in order to reach the imaginery "green' at the end of the fairway 10. The central processing unit keeps track of the accumulated distance T and number N of successive shots and displays the number of shots taken and accumulated distance or remaining distance |A-T| that the ball must be hit to reach the "green" after each shot.

When the total distance of successive shots equals the distance from tee to "green", the player may walk the short distance to the adjacent putting green 14 in order to "putt out".

In order that a player may play a complete "round" of golf, the central processing unit may store a series of 9 or 18 distances corresponding to successive holes on a golf course. When a particular hole is complete, the video terminal displays the total distance to the next "green". Alternatively, such distances to the next "green" could be controlled by the player from the video terminal.

Such a fairway 10 should ordinarily be located, for example, along one side of a conventional driving range. Alternatively, several such fairways may be provided adjacent to each other so that, for example, a player may play 9 holes of golf by successively playing on each fairway. In such an embodiment, one central processing unit would be provided in a clubhouse and connected to respective video display terminals provided at each of the tees and to each set of ground surveillance units 16. In such an arrangement, each fairway would have associated with it a corresponding "hole length" A (distance from tee to "green") in the central processing unit 18.

Figure 2:
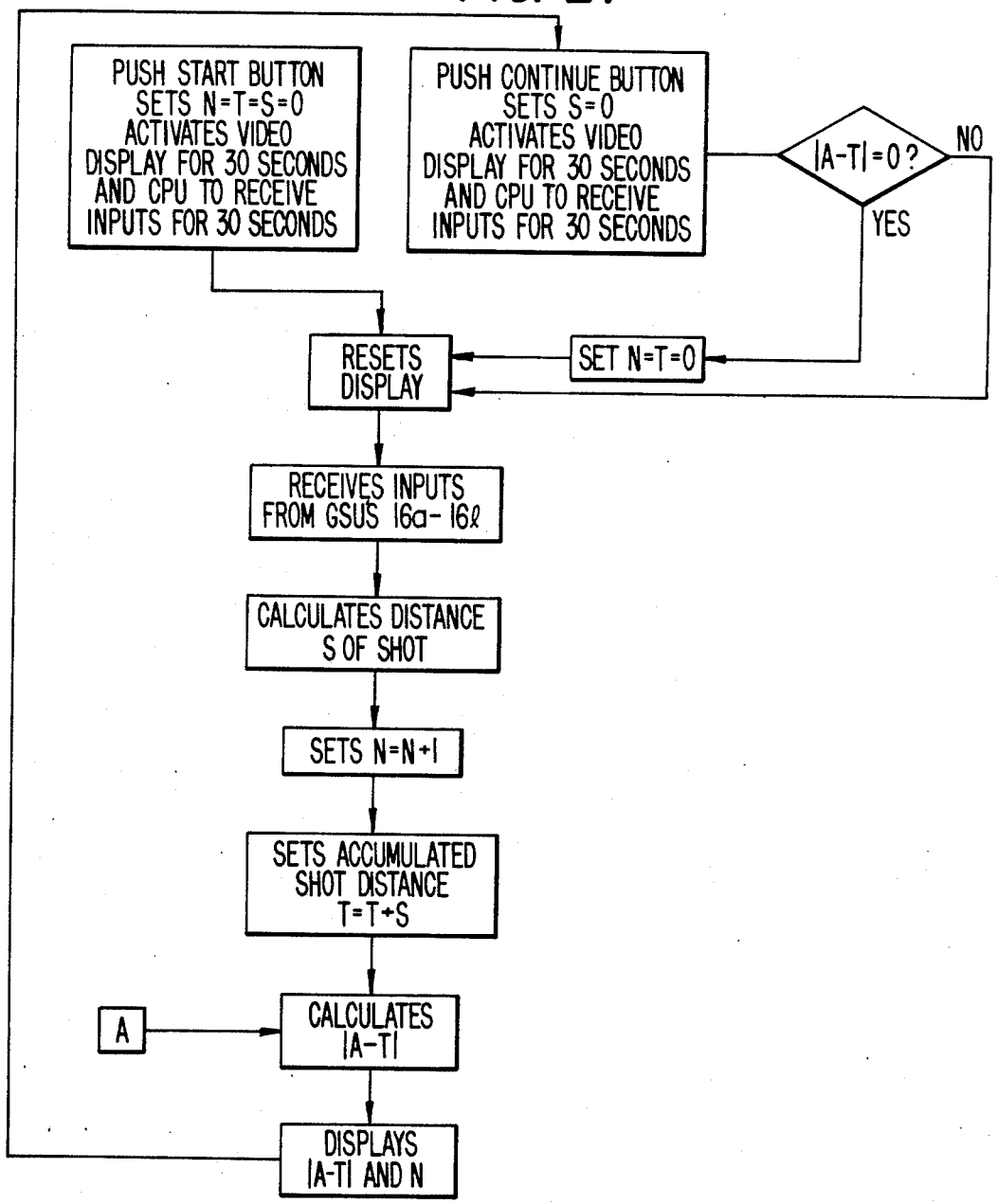

In operation, and referring to the flow chart in FIG. 2, a player would press a start button at the video terminal to initiate play. This activates the system for 30 seconds, resets the display and sets N, T and S to zero. The player then hits the ball causing the gsu's to send output signals to the central processing unit. The central processing unit then calculates the distance S of the shot based on the inputs from the gsu's. The central processing unit also increases the number N representing the number of shots on the particular hole by one. The central processing unit also adds the distance S of the shot to the accumulated distance T of prior shots. The central processing unit then calculates the absolute value of the difference between the distances T and A to reflect the further distance that the ball must be hit to reach the "green". The video display then displays the values |A-T| and N. If the further distance required to hit the ball to reach the green is equal to zero then N is set equal to zero and the player is to begin the next "hole". After 30 seconds, the video display is automatically turned off. When the player decides to hit another shot, he pushes a continue button on the video display terminal which resets the display and sets S equal to zero without changing the values of N, T and A.

While only preferred embodiments of the invention have been disclosed, it is to be understood that the invention is described by way of example only, and not in a limiting sense, and the scope of the present invention is defined by the following claims.

What is claimed is:

1. A golf playing area, comprising:
   a playing field,
   a tee area at one end of said playing field,
   a plurality of radar ground surveillence units located along a straight line extending from said tee area on said playing field, at successively greater distances from said tee area, each of said units comprising means for detecting by radar all golf balls moving on the ground through a predetermined circular area of said playing field centered at the unit resulting from golf shots from said tee area, said units being successively spaced from each other at such distances that the predetermined circular areas of adjacent ones of said units at successively greater distances from said tee area overlap so that all of said predetermined areas define a combined continuous area, and
   central control means, including a computer video display terminal adjacent said tee area and responsive to the output of said units, for calculating and displaying on said terminal a visual indication of the distance of the furthest one of said units detecting a golf ball moving in one of the predetermined areas containing said units from the tee area, and the sum of succession of distances calculated by said central control means.

2. A golf playing area as in claim 1, wherein said central control means for calculating and displaying on said terminal the number of golf shots taken from said tee area in succession until said sum equals a predetermined value.

* * * * *